Patented Oct. 20, 1936

2,057,964

UNITED STATES PATENT OFFICE 2,057,964

PROCESS FOR THE MANUFACTURE OF DERIVATIVES OF α,α,α-TRIBROMOETHANE

Hans-Paul Müller, Wuppertal-Elberfeld, Germany, assignor to Winthrop Chemical Company Inc., New York, N. Y., a corporation of New York No Drawing. Application October 8, 1931, Serial No. 567,767. In Germany October 13, 1930

20 Claims. (Cl. 260—113)

The present invention relates to a new process of preparing oxygenated derivatives of α,α,α-tribromoethane.

In accordance with the invention hereinafter described oxygenated derivatives of α,α,α-tribromoethane of the general formula:

$$Br_3C-R$$

wherein R means a radical selected from the group consisting of the carbinol-, the aldehyde- and the carboxylic group, and of derivatives of these groups, for instance, an ester-, amide- or urethane-group, are obtainable by transforming a derivative of α,α,α-trichloroethane of the general formula:

$$Cl_3C-R$$

wherein R has the above indicated meaning, into the corresponding bromine compound.

The process of the invention is by causing derivatives of the α,α,α-trichloroethane of the indicated kind, for example, trichloroethanol, trichloroacetaldehyde, trichloroacetic acid and their derivatives, such as trichloroacetic amides, for example, the trichloroacetic amide or dimethyl-amide, trichloroethylesters, for example, the trichloroethylester of acetic or trichloroacetic acid, trichloroethylurethanes and trichloroacetaldehyde acetals, to react with bromides of certain metals, preferably of the alkali and alkaline earth metals and of aluminium. However, also salts of bromine with other cations have proved operable in my present process. By experiments it has been ascertained that the bromides of the following cations behave equivalent in my present process, and, therefore, are to be included in my present invention, namely the bromides of ammonium, lithium, sodium, potassium, magnesium, calcium, strontium, barium, zinc, boron, aluminium, iron, cobalt, nickel, copper and tin.

Correspondingly, when transforming, for instance, trichloroethanol into tribromoethanol, the reaction performs according to the following equation:

$$Cl_3C-CH_2OH+AlBr_3=Br_3C-CH_2OH+AlCl_3$$

Preferably the reaction is performed in the presence of a suitable diluent, such as, for example, water, alcohols, acetone, ethylacetate, ligroin, carbon disulfide; the diluent is to be adjusted to the properties of the bromide used in each individual case because the diluent must be inert to the bromide. For example, aluminium bromide is to be used in an indifferent solvent, in order to prevent the decomposition of the aluminium bromide by the solvent, whereas potassium bromide can be used in solvents, such as water, alcohol, etc. which are inert to potassium bromide.

The reaction temperature may vary within wide limits and is dependent on the specific bromide employed; sodium bromide, for example, requires heating to an elevated temperature, say to the boiling point of the diluent employed, whereas with aluminium bromide the reaction performs at a lower temperature, for example, at room temperature. Likewise the reaction time depends on the kind of bromide and on the reaction temperature employed in the individual case and may vary within wide limits, say from 1 to 48 hours.

In this reaction it is immaterial whether the bromides themselves are employed as acting agents and are caused to act on the chlorine compounds, or whether the bromides are produced in the course of the reaction and thus caused to react as it were in the nascent state.

The following examples illustrate my invention without limiting it thereto.

*Example 1.*—148 parts by weight of trichloroethanol are dissolved in 100 parts by weight of carbon disulfide. This solution is caused to drop, while stirring and cooling, into a suspension of 270 parts by weight of aluminium bromide in 100 parts by weight of ligroin. After standing for about 4 hours at room temperature, the reaction mixture is poured on to ice and the resulting tribromoethanol blown off with steam or extracted with an indifferent solvent. After recrystallizing from a hydrocarbon, such as ligroin, the product melts at 79° C.

Instead of the aluminium bromide employed a corresponding quantity of iron bromide, and instead of ligroin, carbon disulfide can be used with the same good effect.

*Example 2.*—240 parts by weight of bromine and 200 parts by weight of methylene bromide are added to 148 parts by weight of trichloroethanol. 27 parts by weight of aluminium turnings are then introduced in small portions at a time, while stirring at room temperature. The reaction mixture is then maintained at 40° C. for 4 hours. The further working up to tribromoethanol is the same as indicated in Example 1.

Instead of aluminium turnings other metal filings, for example iron, copper, or tin filings, magnesium, calcium or zinc turnings likewise can be employed.

*Example 3.*—147 parts by weight of trichloroacetaldehyde are dissolved in 200 parts by weight of ligroin of a boiling point of about 140° C. 270 parts by weight of aluminium bromide are added in small portions while stirring to this solution. After the suspension has been stirred for about 24 hours at 60° C., the reaction mixture is agitated with sulfuric acid, the ligroin removed by vacuum distillation and the tribromoacetaldehyde formed distilled in vacuo.

Example 4.—37 parts by weight of aluminium foil are introduced in small portions into a mixture of 163 parts by weight of trichloroacetic acid, 400 parts by weight of ligroin and 340 parts by weight of bromine while stirring. After standing for about 24 hours at 60° C., the mixture is poured on to ice. By extraction with ether, tribromoacetic acid is obtained in good yield, after evaporating the solvent.

When starting with trichloroacetic dimethylamide instead of using trichloroacetic acid or, for instance, with the trichloroethylester of trichloroacetic acid, tribromoacetic dimethylamide, the tribromoethylester of tribromoacetic acid, respectively, are obtained. In the same manner tribromoethylurethane can be prepared.

Example 5.—163 parts by weight of trichloroacetic acid are boiled under reflux for 10 hours with a solution of 420 parts by weight of potassium bromide in 420 parts by weight of water. Instead of potassium bromide, sodium or ammonium bromide likewise can be employed; the water used as solvent may be replaced by acetone or an alcohol such as methanol or ethanol. After acidification the tribromoacetic acid is obtained from the solution in the customary manner.

Example 6.—163 parts by weight of trichloroacetic acid are fused for about 4 hours with 310 parts by weight of anhydrous calcium bromide. By working up as described in Example 4, tribromoacetic acid is obtained in a good yield. With the same effect strontium or barium bromide can be used.

It is obvious that the present invention is not limited to the foregoing examples nor to the specific details given therein, thus, for instance, the different metal bromides specified above, may be used in combination with another derivative of trichloroethane derivative or with another solvent. It is to be understood that the use of the metal bromides above specified is to be considered equivalent to the use of the metal bromides when used in the nascent state, and that, therefore, also the latter manner of working is to be included in the following claims.

I claim:

1. The process which comprises causing a bromide containing a cation of the group consisting of ammonium, lithium, sodium, potassium, magnesium, calcium, strontium, barium, zinc, boron, aluminium, iron, cobalt, nickel, copper and tin, to act upon trichloroethanol.

2. The process which comprises causing a bromide containing a cation of the group consisting of ammonium, lithium, sodium, potassium, magnesium, calcium, strontium, barium, zinc, boron, aluminium, iron, cobalt, nickel, copper and tin, to act upon trichloroethanol in the presence of a solvent which is inert to the starting materials.

3. The process which comprises causing aluminium bromide to act upon trichloroethanol in the presence of an organic solvent which is inert to the starting materials.

4. The process which comprises causing aluminium bromide to act upon trichloroethanol at room temperature in the presence of an organic solvent which is inert to the starting materials.

5. The process which comprises causing aluminium bromide to act upon trichloroethanol at room temperature in the presence of ligroin.

6. The process which comprises reacting upon about 1 mol. of trichloroethanol with about 1 mol. of aluminium bromide in the presence of ligroin at room temperature during about 4 hours, then pouring the mixture on to ice and separating the tribromoethanol formed.

7. The process which comprises causing a bromide containing a cation of the group consisting of ammonium, lithium, sodium, potassium, magnesium, calcium, strontium, barium, zinc, boron, aluminium, iron, cobalt, nickel, copper and tin, to act upon trichloroacetaldehyde.

8. The process which comprises causing a bromide containing a cation of the group consisting of ammonium, lithium, sodium, potassium, magnesium, calcium, strontium, barium, zinc, boron, aluminium, iron, cobalt, nickel, copper and tin, to act upon trichloroacetaldehyde, in the presence of a solvent which is inert to the starting materials.

9. The process which comprises causing aluminium bromide to act upon trichloroacetaldehyde in the presence of an organic solvent which is inert to the starting materials.

10. The process which comprises causing aluminium bromide to act upon trichloroacetaldehyde at about 60° C. in the presence of ligroin.

11. The process which comprises reacting upon about 1 mol. of trichloroacetaldehyde with about 1 mol. of aluminium-bromide in the presence of ligroin at about 60° C. during about 24 hours, while stirring, then agitating the reaction mixture with sulfuric acid and separating the tribromoacetaldehyde formed.

12. The process which comprises causing a bromide containing a cation of the group consisting of ammonium, lithium, sodium, potassium, magnesium, calcium, strontium, barium, zinc, boron, aluminium, iron, cobalt, nickel, copper and tin, to act upon trichloroacetic acid.

13. The process which comprises causing a bromide containing a cation of the group consisting of ammonium, lithium, sodium, potassium, magnesium, calcium, strontium, barium, zinc, boron, aluminium, iron, cobalt, nickel, copper and tin to act upon trichloroacetic acid in the presence of a solvent which is inert to the starting materials.

14. The process which comprises causing aluminium bromide to act upon trichloroacetic acid in the presence of an organic solvent which is inert to the starting materials.

15. The process which comprises causing aluminium bromide to act upon trichloroacetic acid at about 60° C. in the presence of ligroin.

16. The process which comprises reacting upon about 1 mol. of trichloroacetic acid with about 1⅓ mols of aluminium bromide in the presence of ligroin at about 60° C. during about 24 hours, while stirring, then pouring the mixture on to ice and separating the tribromoacetic acid formed.

17. The process which comprises causing a bromide containing a cation of the group consisting of ammonium, lithium, sodium, potassium, magnesium, calcium, strontium, barium, zinc, boron, aluminium, iron, cobalt, nickel, copper and tin, to act upon a derivative of $\alpha,\alpha,\alpha$-trichloroethane of the general formula:

$$Cl_3C-R$$

wherein R means a radical selected from the group consisting of the carbinol-, aldehyde- and carboxylic groups and of aliphatic ester-derivatives of the carbinol group and of aliphatic ester- and amide derivatives of the carboxylic group.

18. The process which comprises causing a bromide containing a cation of the group consisting of ammonium, lithium, sodium, potassium, magnesium, calcium, strontium, barium, zinc, boron, aluminium, iron, cobalt, nickel, copper and tin, to act upon a derivative of α,α,α-trichloroethane of the general formula:

$$Cl_3C-R$$

wherein R means a radical selected from the group consisting of the carbinol-, aldehyde- and carboxylic groups and of aliphatic ester-derivatives of the carbinol group and of aliphatic ester- and amide derivatives of the carboxylic group, in the presence of a solvent which is inert to the starting materials.

19. The process which comprises causing aluminium bromide to act upon a derivative of α,α,α-trichloroethane of the general formula:

$$Cl_3C-R$$

wherein R means a radical selected from the group consisting of the carbinol-, aldehyde- and carboxylic groups and of aliphatic ester derivatives of the carbinol group and of aliphatic ester- and amide derivatives of the carboxylic group.

20. The process which comprises causing aluminium bromide to act upon a derivative of α,α,α-trichloroethane of the general formula:

$$Cl_3C-R$$

wherein R means a radical selected from the group consisting of the carbinol-, aldehyde- and carboxylic groups and of aliphatic ester derivatives of the carbinol group and of aliphatic ester- and amide derivatives of the carboxylic group in the presence of a solvent which is inert to the starting materials.

HANS-PAUL MÜLLER.